F. B. HARNISH.
MIDDLINGS-SEPARATOR.
No. 185,526.   Patented Dec. 19, 1876.
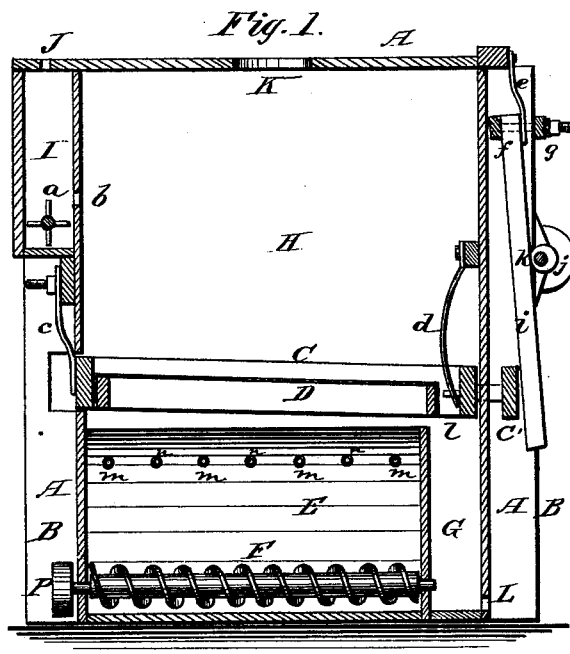
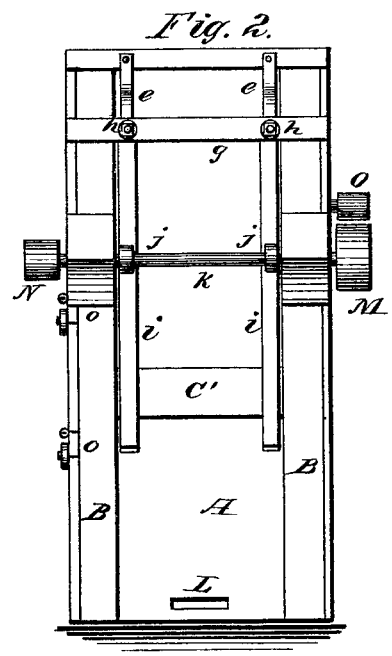
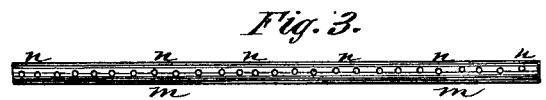

UNITED STATES PATENT OFFICE.

FRANKLIN B. HARNISH, OF NORA SPRINGS, IOWA.

IMPROVEMENT IN MIDDLINGS-SEPARATORS.

Specification forming part of Letters Patent No. 185,526, dated December 19, 1876; application filed March 4, 1876.

*To all whom it may concern:*

Be it known that I, FRANKLIN B. HARNISH, of Nora Springs, Floyd county, State of Iowa, have invented new and useful Improvements in Middlings-Purifiers, of which the following is a full description, reference being had to the accompanying drawings, in which—

Figure 1 is a longitudinal vertical section; Fig. 2, an end view; Fig. 3, a detail, showing one of the ventilating-pipes enlarged.

The object of this invention is to separate the component parts of middlings more effectually and economically than has been heretofore done; and its nature consists in providing the case with a separate feed-chamber and suction-chamber, and in the improved methods of operating the parts and ventilating the case.

In the drawings, A represents the case; B the corner-posts; C, the vibrating frame; D, the sieve; E, the conveyer chamber or box; F, the conveyer; G, the space into which the coarser material passes; H, the suction chamber; I, the feed-chamber; J, the hopper-opening; K, the opening in the case A, to which the pipe or tube of the suction-fan is applied; L, the opening for withdrawing the material from the space or chamber G; M N O P, the pulley-wheels; $a$, the feed-wheel; $b$, the feed-opening; $c\ d$, the spring-bars supporting the vibrating frame C; $e$, the straps or bars supporting the bars $i$; $f\ g$, the cross-bars for adjusting the upper ends of the bars $i$; $h$, the screw-bolts; $i$, the hanging bars for vibrating the frame C; $j$, the eccentrics on the shaft $k$ for operating the bars $i$; $k$, the shaft of the pulleys M N; $l$, the opening between the sieve D and the end of the frame C, for the passage of the coarse material; $m$, the ventilating pipes or tubes, and $n$ the perforation in the pipes $m$; $o$, the doors or slides into the case A.

The case A B is made of any convenient size, and by casing the posts B on the inside, at the ends, the parts for operating the shaker are more conveniently attached, and are out of the way.

The shaker or frame C is made, at one end, to pass through the casing, so that the bars or springs $c$ can be applied on the outside, so as to be easily accessible in case any repairs or adjustments are desired. At the opposite end the side bars of the frame are passed through the casing, and an additional cross-bar, $c'$, is applied. On this frame C a sieve or separator, D, is attached, so as to leave an opening, $l$, through which any material which is too coarse to pass through the sieve may fall.

The sieve D is made of suitable wire or bolting cloth, and with its frame is given a sufficient angle to cause such material as will not pass through it to travel toward the opening $l$.

Below the frame C the conveyer-case E is applied, which, with its conveyer F, is constructed in the usual manner, the inclined sides of the chamber E bringing the material down to the conveyer F.

In order to vibrate the sieve or separator D, pendent arms $i$ are supported from the upper edge of the case by straps or bars $e$. These bars $e$ also support the frame $f\ g\ h$, the outer bar $g$ of which rests against the posts B, so that by turning the screw-nuts on the rods $h$ the upper ends of the bars $i$ may be adjusted forward or back, so as to give a greater or less throw to the frame C in its reciprocating movements, as that operation brings the bars $i$ closer to or farther from the eccentrics $j$ on the shaft $k$.

The frame C is pressed back by the eccentrics $j$ operating against the arms $i$, and it is returned by the springs $c\ d$, one or both, as it is not essential to the operation of this machine that both $c$ and $d$ should be spring-bars.

The feeding-chamber I is provided at its lower end with a shaft, provided with wings $a$, which revolves so as to throw the middlings through the slit or opening $b$ into the chamber H. This chamber I and appliances are located outside of the suction-chamber H, leaving the latter chamber entirely open, allowing a free passage for the air.

The lower or conveyer chamber E is provided with a series of pipes or tubes, $m$, which are perforated, through their entire length, on one side, so as to admit air. A suction-fan is to be applied to the opening K, and these pipes $m$ prevent currents of air from passing through the chamber H, and distribute it equally throughout the entire chamber.

The side of the case A is provided with slides or hinged doors o, by means of which access is obtained to the interior for the purpose of repairs or cleaning.

In operation, the middlings are fed through the hopper-opening J into the chamber I, from which they are thrown out, by the winged shaft a, through the opening b, into the suction-chamber H. (The suction-fan and its connections are not shown, as they may be located anywhere in the mill. They are connected with the machine at the opening K, or nearly central with the chamber H.) As the middlings are thrown out through the opening b into the chamber H, the suction-blast takes out the fine light particles, and carries them away out of the case A. The heavier particles fall upon the sieve or separator D in the frame C, which frame is rapidly vibrated, and the heavier finer portions pass through the sieve D into the conveyer-chamber E, and are conveyed out by the conveyer F. The coarser portions pass over the lower end of the sieve, at the opening l, into the chamber G, from which they are taken out at the opening L, which opening is also provided with a cover or door.

By introducing the air through the pipes m, an equal flow of air is had throughout the entire case, or throughout that portion of it which is traversed by the middlings, and a uniform action is obtained, which could not be had by simple openings through the case A.

What I claim as new, and desire to secure by Letters Patent, is as follows:

1. The combination of the reciprocating frame C and bars c d with the bars i and eccentrics j, located outside of the case, substantially as specified.

2. The screw-rods h and bar g, in combination with the bars i, for adjusting the length of the vibration of the frame C, substantially as described.

FRANKLIN B. HARNISH.

Witnesses:
W. P. GAYLORD,
LEWIS BENEDIT.